US009216520B2

(12) United States Patent
Loubaresse et al.

(10) Patent No.: US 9,216,520 B2
(45) Date of Patent: *Dec. 22, 2015

(54) METHOD FOR MANUFACTURING A RUBBER COMPOSITION

(75) Inventors: Jean-Marc Loubaresse, Les Martres D'Artiere (FR); Floriandre Voisin, Chamalieres (FR); Pierre Annet, Clermont-Ferrand (FR); Bruno Dussardier, Surat (FR); Gérald Huguenot, Clermont-Ferrand (FR); Arnaud Lapra, Saint Saturnin (FR); Julien Loyau, Clermont-Ferrand (FR); Vincent Pelissier, Romagnat (FR)

(73) Assignees: COMPAGNIE GENERALE DES ETABLISSEMENTS MICHELIN, Clermont-Ferrand (FR); Michelin Recherche et Technique S.A., Granges-Paccot (CH)

( * ) Notice: Subject to any disclaimer, the term of this patent is extended or adjusted under 35 U.S.C. 154(b) by 405 days.

This patent is subject to a terminal disclaimer.

(21) Appl. No.: 13/642,416
(22) PCT Filed: Mar. 4, 2011
(86) PCT No.: PCT/EP2011/053282
§ 371 (c)(1),
(2), (4) Date: Mar. 26, 2013
(87) PCT Pub. No.: WO2011/131409
PCT Pub. Date: Oct. 27, 2011

(65) Prior Publication Data
US 2013/0203892 A1 Aug. 8, 2013

(30) Foreign Application Priority Data

Apr. 19, 2010 (FR) .................................... 10 52949

(51) Int. Cl.
*C08K 3/00* (2006.01)
*B01F 3/08* (2006.01)
(Continued)

(52) U.S. Cl.
CPC ................. *B29B 7/325* (2013.01); *B29B 7/007* (2013.01); *B29B 7/42* (2013.01); *B29B 7/568* (2013.01);
(Continued)

(58) Field of Classification Search
CPC ........ B29B 7/007; B29B 7/325; B29B 7/568; B29B 7/7461; B29B 7/7495; B29B 7/823; B29B 7/90; B29B 7/42; B60C 1/00; C08J 3/201; C08J 3/203; C08J 2321/00; C08K 3/0033; C08K 5/0008; C08L 21/00
USPC ................................ 523/322, 323; 524/575.5
See application file for complete search history.

(56) References Cited

U.S. PATENT DOCUMENTS 5,158,725 A   10/1992   Handa et al.
5,597,235 A   1/1997   Barnes et al.
(Continued)

FOREIGN PATENT DOCUMENTS

EP   0 972 790   1/2000
EP   1 988 117   11/2008
(Continued)

*Primary Examiner* — William Cheung
(74) *Attorney, Agent, or Firm* — Cozen O'Connor (57) ABSTRACT

Process for the manufacture of a rubber composition comprising various constituents, such as base elastomers, reinforcing fillers, additives and a vulcanization system, during which the following stages are carried out:

A—using a continuous mixing device, a starting rubber composition comprising the reinforcing fillers and optionally other components, with the exception of the crosslinking system, is produced, the operating parameters for the continuous mixing device being chosen so that:

a—the residence time of the elastomer in the mixing chamber is between 20 and 60 seconds, b—the specific energy conferred on the rubber composition is between 2000 joules/gram and 5000 joules/gram, B—at the outlet for the starting rubber composition from the mixing chamber, the temperature of the said starting rubber composition is lowered to a temperature of less than 140° C. in less than 5 minutes.

7 Claims, 3 Drawing Sheets

(51) Int. Cl.
  *B29B 9/06* (2006.01)
  *B29B 7/32* (2006.01)
  *B29B 7/00* (2006.01)
  *B29B 7/42* (2006.01)
  *B29B 7/56* (2006.01)
  *B29B 7/74* (2006.01)
  *B29B 7/82* (2006.01)
  *B29B 7/90* (2006.01)
  *B60C 1/00* (2006.01)
  *C08J 3/20* (2006.01)
  *C08K 5/00* (2006.01)

(52) U.S. Cl.
  CPC ............ *B29B 7/7461* (2013.01); *B29B 7/7495* (2013.01); *B29B 7/823* (2013.01); *B29B 7/90* (2013.01); *B60C 1/00* (2013.01); *C08J 3/201* (2013.01); *C08J 3/203* (2013.01); *C08K 3/0033* (2013.01); *C08K 5/0008* (2013.01); *C08J 2321/00* (2013.01)

(56) References Cited

U.S. PATENT DOCUMENTS 5,916,956 A    6/1999    Wang et al.
6,686,410 B1   2/2004    Tomlinson

FOREIGN PATENT DOCUMENTS

EP    1 988 117 A1 *   11/2008
FR    2 698 820         6/1994

* cited by examiner

METHOD FOR MANUFACTURING A RUBBER COMPOSITION

RELATED APPLICATIONS

This is a U.S. National Phase Application under 35 USC 371 of International Application PCT/EP2011/053282 filed on Mar. 4, 2011.

This application claims the priority of French application no. 10/52949 filed Apr. 19, 2010, the entire content of which is hereby incorporated by reference.

FIELD OF THE INVENTION

The invention relates to the field of the mixing of elastomers and more particularly of the manufacture of rubber compositions intended for the production of tires used to equip ground vehicles.

BACKGROUND OF THE INVENTION

The performance requirement of modern tires, beyond the qualities required for running conditions which are sometimes extreme, is increasingly directed towards the durability of the tire and the reduction in its rolling resistance.

It is known to a person skilled in the art that the improvement in the wear resistance may be reflected in an increase in the energy dissipation and that the progress achieved in recent years is the subject of compromise between these two performances, the limits of which it has been endeavoured to push back by modifying the rubber compositions and by exploring novel manufacturing methods.

SUMMARY OF THE INVENTION

It is an object of the invention to provide a method which makes it possible, without affecting the wear performance, to greatly reduce the phenomena of energy dissipation inside the material when the latter is subjected to cyclical stresses.

The process according to an embodiment of the invention uses, in a specific and novel manner, a known mixing device and in providing operating ranges for the device which make it possible to obtain rubber compositions having very unconventional and unexpected properties in comparison with the normal preparation processes.

The process according to an embodiment of the invention resorts to a continuous mixing means, such as described, for example, in the publication EP 605 781.

The process according to the invention makes possible the manufacture of a rubber composition formed of various constituents, such as base elastomers, reinforcing fillers, additives and a vulcanization system.

This process comprises the following stages:

A—using a continuous mixing device comprising a mixing chamber comprising at least one rotor rotating in a stator and extending between an upstream end and a downstream end, between which the material gradually advances, and comprising appliances for the metering and forced introduction of the base elastomer or elastomers, driving back the said base elastomers through a pipeline emerging upstream of the mixing chamber, a starting rubber composition comprising the reinforcing fillers and optional additives, with the exception of the crosslinking system, is produced, the operating parameters for the continuous mixing device being chosen so that    a—the residence time of the elastomer in the mixing chamber is between 20 and 60 seconds,    b—the specific energy conferred on the rubber composition is between 2000 joules/gram and 5000 joules/gram, B—at the outlet of the continuous mixing device, the temperature of the rubber composition is lowered to a temperature of less than 140° C. in less than 5 minutes.

Preferably, during stage A, additives are also incorporated, so as to optimize the use of the continuous mixing means, which comprises a limited number of introduction means.

Preferably, during stage A, the rotational speed of the rotor is between 50 and 500 rev/min, and more particularly between 200 and 400 rev/min.

Preferably, during stage A, the maximum theoretical shear rate ($\dot{\gamma}$) of the rubber composition in the mixing chamber is between 15 000 s$^{-1}$ and 40 000 s$^{-1}$.

Preferably, during stage A, the degree of filling of the mixing chamber is between 5% and 40%.

Preferably, on conclusion of stage B, a final rubber composition is produced using one or more continuous or batchwise mixing means (200, 300) of internal and/or external mixer type, a predetermined volume of the starting rubber composition, the crosslinking system and also any remaining elastomer, fillers and additives being incorporated, the operating parameters for the continuous or batchwise mixing means being chosen so that the additional specific energy conferred on the rubber composition during this stage is between 500 joules/gram and 1800 joules/gram.

The properties of the composition are very obviously assessed once the final mixture is completed, that is to say when all of the components have been introduced, which components comprise in particular the crosslinking agents.

In order for the description which follows to be well understood, the specific energy conferred on the rubber composition throughout the duration of the manufacturing process in a continuous or batchwise mixing means corresponds to the energy (in joules) supplied to the mixture by the motor (or motors) used to rotate the rotor (or rotors) of the mixer, divided by the weight of the rubber composition produced. This energy can be calculated by the following formulae:

$$\left(\int_0^T P(t)dt\right) \div \left(\int_0^T M(t)dt\right),$$

in the case of the continuous mixing, or $$\left(\int_0^T P(t)dt\right) \div M,$$

in the case of the batchwise mixing,
in which:
P(t) is the instantaneous power (in watts) supplied by the motor (or motors), minus the power consumed by the transmission means between the shaft of the motor and the shaft of the rotor,
M(t) is the instantaneous flow rate by weight (in grams/s) of the rubber composition produced using the mixer,
M is the total weight (in grams) of the mass of mixture introduced into the continuous mixer.

This calculation can be easily carried out, whatever the type of mixing means chosen, by measuring the electrical power consumed by the motor (or motors) during the mixing, minus the power consumed by the plant in neutral. The viscoelastic properties of a material are described by physical quantities, such as the viscous modulus (G"), the elastic modulus (G') or the ratio $$\frac{G''}{G'} = Tg\delta,$$

which is the tangent of the angle of phase lag between the stress and the strain, when the material is subjected to a sinusoidal stress, and which makes it possible, inter alia, to characterize the dissipation phenomena within the material.

Without it being possible to explain all the physical phenomena involved in the processing process according to the invention, a decrease in the value of the tangent δ is observed, as will be seen subsequently using the experimental results and for a wide rubber composition variety (see below) produced using the said process, in comparison with the manufacture of the same mixture using a known manufacturing process of the type consisting in manufacturing on an internal and/or external mixer alone.

Nevertheless, it is observed that the process according to the invention, due to its ability to provide the initial composition with a large amount of energy during a very short time, also has the effect of significantly raising the mixing temperature.

Consequently, preferably, so as to confer this high specific energy on the mixture during stage A, the choice will be made of a rotational speed of the rotor of between 50 and 500 rev/min and more particularly of between 200 and 400 rev/min.

Likewise, and still with the same aim, the diameter of the rotor and the clearance between the rotor and the stator of the continuous mixing device will be given dimensions in order that, during stage A, the maximum theoretical shear rate ($\dot{\gamma}$) of the rubber composition at any point in the mixing chamber (11) is between 15 000 s$^{-1}$ and 40 000 s$^{-1}$.

Maximum theoretical shear rate $\dot{\gamma}$ is understood to mean the effect of the shearing obtained when the rubber composition is forced to move between the threads of the rotor and the stator, or between the blades of the mixer and the vessel of the internal mixer, or in the air gap of the two rolls of the external mixer, as will be described in detail in the continuation of the present description.

The maximum theoretical shear rate is expressed by the following formula:

$$\dot{\gamma} = (2\pi * V_p * R) \div (60 * e)$$

in which:
V$_p$ is the rotational speed (in revolutions per minute) of the rotor of the continuous mixer, of the blades of the internal mixer or of the rolls of the external mixer,
R (in m) is the radius of the rotor, of the blades of the internal mixer or of the rolls of the external mixer, and
e (in m) is equal to the minimum clearance between the threads of the rotor and the internal surface of the stator, or to the clearance between the blades and the vessel of the internal mixer, or to the air gap between the two rolls of the external mixer.

The term "mixing time" is understood to mean the time taken by the elastomer to cross the mixing chamber from its upstream end to its downstream end, in the case of the continuous mixing device, or the presence time of the elastomer in the mixing vessel, in the case of an internal mixer, or the kneading time of the elastomer, in the case of an external mixer.

Preferably, during stage A, a degree of filling of the mixing chamber will be chosen which is well below 100% and preferably between 5% and 40%.

The degree of filling is the part of the volume occupied by the rubber composition in the mixing chamber, the volume of which corresponds to the free volume available between the rotor and the internal wall of the stator (or between the blades of the internal mixer and the internal wall of the vessel).

Finally, with the aim of not detrimentally affecting the physical properties conferred on the starting composition, on conclusion of stages A and B, it will be arranged for the mixer to be given dimensions and to be operated so that, during the stage of producing the final composition, the specific energy supplied to the mixture is within the conventional limits known for producing good homogeneity of the final mixture and as a general rule between 500 joules/gram and 1800 joules/gram, according, on the one hand, to the type of mixer, which can be of the continuous or batchwise and internal or external mixer type, and, on the other hand, according to the kneading time chosen, which can vary between 1 minute and 30 minutes, depending on the type of mixer chosen.

In the context of the present description, the term "rubber composition" is understood to mean a composition based on at least one elastomer, preferably a diene elastomer, such as a natural or synthetic rubber, comprising reinforcing fillers, additives and a vulcanization system.

The elastomer (or without distinction "rubber") used is preferably of the diene type, although other elastomers can be used. "Diene" elastomer is understood to mean, in a known way, an elastomer resulting at least in part (i.e., a homopolymer or a copolymer) from diene monomers (monomers carrying two conjugated or nonconjugated carbon-carbon double bonds).

The diene elastomer chosen will preferably belong to the group consisting of polybutadienes (BRs) (in particular those having a content of cis-1,4 bonds of greater than 90%), synthetic polyisoprenes (IRs) preferably of the cis-1,4 type, natural rubber (NR), butadiene copolymers, isoprene copolymers and the mixtures of these elastomers; such copolymers are more preferably chosen from the group consisting of butadiene/styrene copolymers (SBRs), isoprene/butadiene copolymers (BIRs), isoprene/stirene copolymers (SIRs), isoprene/butadiene/stirene copolymers (SBIRs), isobutene/isoprene copolymers (IIRs) and the mixtures of such copolymers.

According to other embodiments, the diene elastomer can also be composed, in all or part, of another diene elastomer, such as, for example, an SBR elastomer, used or not used as a blend with another elastomer, for example of the BR type.

The rubber composition can comprise just one or several diene elastomer(s), it being possible for the latter to be used in combination with any type of synthetic elastomer other than a diene elastomer, indeed even with polymers other than elastomers.

Any filler known for its abilities to reinforce a rubber composition can be used as reinforcing filler, for example an organic filler, such as carbon black, or an inorganic filler, such as silica, with which, in a known way, a coupling agent is combined.

Suitable as carbon blacks are in particular all the carbon blacks conventionally used in tires ("tire grade" blacks). Mention will more particularly be made, among the latter, of carbon blacks of 100, 200, 300, 600 or 700 grade (ASTM) (for example N134, N234, N326, N330, N347, N375, N683 or N772) and generally of blacks having a specific surface preferably of less than 160 m$^2$ per gram (CTAB measurement). Suitable as reinforcing inorganic fillers are in particular inorganic fillers of the silica (SiO$_2$) type, in particular precipitated or fumed silicas exhibiting a BET specific surface of less than 450 m$^2$/g, preferably of less than 200 m$^2$/g. The content of reinforcing filler is preferably greater than 30 phr, for example between 40 and 140 phr (phr meaning parts by weight per hundred parts of total elastomer).

The rubber composition is of the crosslinkable or crosslinked type, that is to say that it comprises by definition a crosslinking system suitable for making possible the crosslinking of the composition during the curing thereof (i.e., the hardening thereof). Preferably, the system for crosslinking the rubber matrix is a "vulcanization" system, that is to say a system based on sulphur (or on a sulphur-donating agent) and on a primary vulcanization accelerator. Various known secondary vulcanization accelerators or vulcanization activators can be added to this base vulcanization system. The sulphur is used at a preferred content of between 0.5 and 10 phr; the primary vulcanization accelerator, for example a sulphenamide, is used at a preferred content of between 0.5 and 10 phr.

The rubber composition can also comprise all or part of the additives normally used in rubber matrices intended for the manufacture of tires, such as, for example, coupling agents, protection agents, such as antiageing agents, antioxidants, antiozonants, plasticizing agents or extending oils, whether the latter are aromatic or nonaromatic in nature (in particular very slightly aromatic or nonaromatic oils), for example of the naphthenic or paraffinic type, with a high or preferably with a low viscosity, MES or TDAE oils, plasticizing resins having a high Tg of greater than 30° C., agents which facilitate the processing (processability) of the compositions in the raw state, tackifying resins, antireversion agents or reinforcing resins.

The final composition thus obtained can subsequently be calendered, for example in the form of a sheet or of a plaque in particular for laboratory characterization, or extruded, for example in order to form a rubber profiled element used in the manufacture of a tire.

DETAILED DESCRIPTION OF THE DRAWINGS

Figure 1:
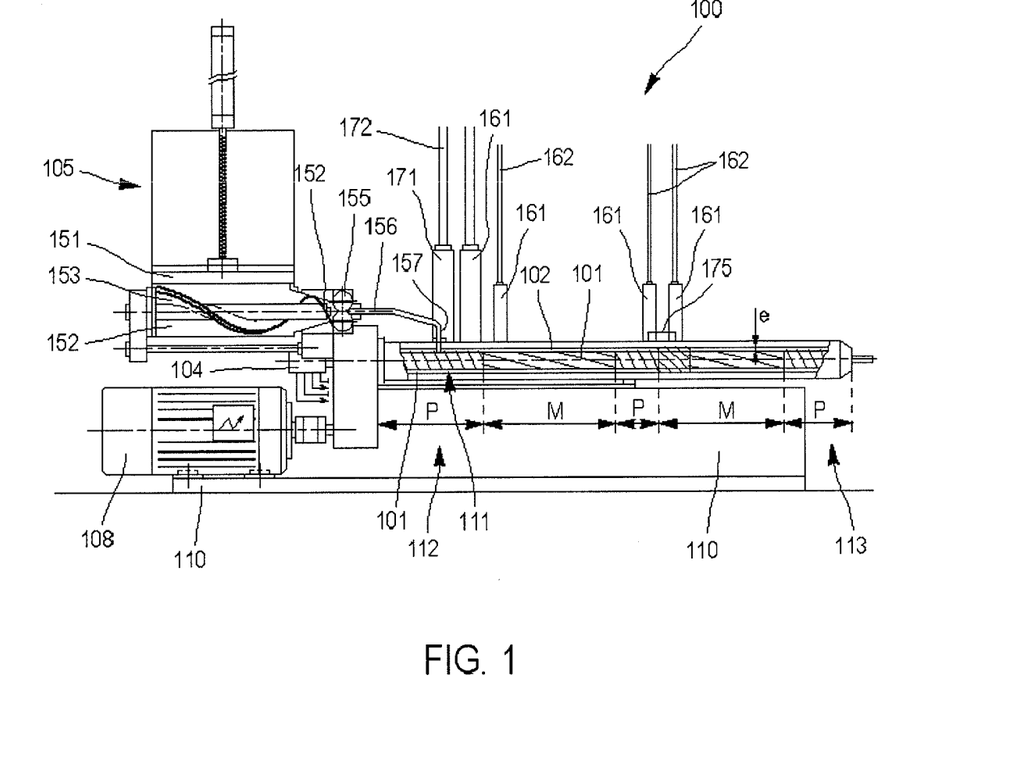
FIG. 1 represents a diagrammatic view of a continuous mixing device used in the context of the process.

The continuous mixing device represented diagrammatically in FIG. 1 is described in detail in the publication EP 605 781, the relevant elements of which will be summarized for the understanding of the invention.

The mixing device comprises a mixing chamber 111 inside which a rotor 101 rotates. The upstream side of the mixing chamber is located by the reference 112 and the downstream side by the reference 113.

The distance e between the blades of the rotor 101 and the internal surface of the stator 102 is determining in assessing the maximum theoretical shear rate of the rubber composition in the mixing chamber.

However, it should be pointed out that the maximum value of the shear rate, set at 40 000 s$^{-1}$ in the context of the present invention, represents a theoretical value. This is because only a few fragments of the mixture are subjected to this shear rate when the said fragments are forced to pass through this reduced air gap.

Hoppers 105 are installed upstream of the machine for the introduction of the base elastomers constituting the starting rubber composition. A ram 151 can slide vertically inside each of the hoppers 105 in order to force the introduction of the elastomers into the chamber 152 in which a knife 153, twisted into a helix, rotates. This knife 153 constitutes a means for shredding the elastomers, removing chips from the elastomer bar or bars placed in the hopper.

A positive displacement vacuum pump 155, for example of gear pump type, is filled up by mechanical means providing transfer of the granules or chips. The pitch formed by the helix forming the knife 153 gradually decreases to add, to the transfer of the chips, a plasticizing action which becomes increasingly intense as the inlet of the gear pump 155 is approached.

The gear pumps 155 are connected to pipelines 156 which combine together into just one pipeline 157 in order to rejoin the mixing chamber 111, which is composed of the volume available between the rotor 101 and the internal surface of the stator 102.

Three zones are distinguished along the rotor 101, the action of which is to provide for the propulsion of the constituents of the mixture (zones P), between which separate zones are noticed, the action of which is to essentially carry out the mixing (zones M) of the various components of the said starting rubber composition.

Other metering and introduction appliances can be distributed along the mixing chamber 111 in order to introduce other constituents into the starting rubber composition at different points along the progression of the base constituents.

Preferably, all the pasty constituents are introduced with metering and forced introduction appliances which are preferably positive displacement vacuum pumps. The pulverulent constituents are also introduced with a positive displacement vacuum pump, upstream of the first zone M and preferably immediately downstream of the point of introduction of the elastomer.

The liquid constituents can be introduced with a positive displacement vacuum pump for liquids which can be of the piston pump type, or any type capable of providing good positive displacement accuracy, such as, for example, a gear pump or a vane pump.

Advantageously, the additives are premixed, alone or with a very small amount of oil (a few % of the amount anticipated by the formulation of the rubber composition) so as to obtain a pasty product. If need be, those of these products which are in the solid phase at ambient temperature are first reheated in order to liquefy them. This pasty mixture, like any other possible pasty constituent, is preferably introduced with a positive displacement vacuum pump (gear pump or piston pump, for example). Advantageously, constituents can be grouped together when there is a large number of constituents used, each in a very small amount, in the formulation of the starting rubber composition under consideration, in that this results in a decrease in the number of metering appliances on the mixing device.

Optionally, the continuous mixing means can comprise metering and introduction appliances 161, 162, reserved for the additives, or 171, 172, dedicated to the reinforcing fillers, distributed along the mixing chamber 111. These means comprise a feed (161, 171) and a storage tank (162, 172) situated upstream of a positive displacement feed means (not represented) of the gear pump or positive displacement vacuum pump type, which drives, under pressure, the component back into the mixing chamber 111.

The mixing chamber 111 comprises, from upstream to downstream, a sequence of zones where the degree of filling is 100%, preceded by a zone for which the degree of filling is less than 100%. This results from the fact that constituents are introduced at different points of the mixing chamber between the upstream end and the downstream end and that, immediately downstream of the introduction point, in order to guarantee that the composition to be produced is done so perfectly, the flow rate is stabilized by reaching a degree of filling of 100%. Thus, immediately before the introduction point, a propulsion zone P was provided.

The construction of the mixing device is modular and can comprise one or more simple propulsion zones P and then one or more mixing zones M.

However, it should be pointed out that the knowledge with regard to the design of the shapes of the rotors and stators of rubber mixing devices is rather empirical. Experimental determinations have to be carried out. With regard to the shapes of these mixing devices, the present invention requires only that they be chosen to produce propulsion zones P and mixing zones M, so that there exist zones where the degree of filling is far below 100% and separate zones for transfer of the material, where the degree of filling can be equal to 100%.

A very simple means for controlling the value of the degree of effective filling of the mixing chamber, in the various zones of the latter, consists in simultaneously halting the rotation of the rotor 101 and the operation of all the metering and introduction appliances, and in then withdrawing the rotor from the stator, which carries away the material in place along the rotor. It is then possible to compare the volumes of material with the theoretical volumes at the different desired zones, the theoretical volume being that available between stator and rotor. A simple visual inspection of the rotor will generally make it possible to immediately see which are the zones where the degree of filling is less than 100%.

It is possible to optimize the degree of filling along its axis, in order to take into account the very great change in the volume occupied by the material as the various constituents are introduced into the mixing chamber 111, by preferably varying the passage cross-section of the material, defined by the surface area comprised between the rotor 101 and the stator 102 over a section perpendicular to the axis of the rotor, and/or the speed of the flow.

In the context of the process according to the invention, it is then arranged for the degree of filling, in the zones which are not highly filled, that is to say in which the said degree of filling is less than 100%, to preferably be between 5% and 40%, so that the energy conferred on the rubber composition all along the movement of the said composition in the mixing chamber is distributed as uniformly as possible.

As a result of the large amount of energy supplied to the mixture, the temperature of the mixture can significantly increase. Consequently, the mixing device can usefully comprise temperature regulation by circulation of fluid inside the rotor 101, via the rotating joint 104, and by circulation of fluid in the stator, indeed even around the pipelines 155 and 156 and around the chamber 152. It will then be observed that the continuous mixing device makes it possible, as a result of the high exchange specific surface, to provide efficient temperature regulation.

The mixing device is driven entirely by just one motor 108 mounted on the stand 110. This motor drives in rotation the rotor 101 and also a drive shaft on which the metering and forced introduction appliances can be engaged or disengaged. Each metering and forced introduction appliance comprises a control which makes it possible to vary the amount metered for one and the same speed of the drive shaft.

Consequently, it will be advisable to deduct, from the power delivered by the motor 108, the power consumed by these various metering appliances via the drive shaft, in order to determine the power conferred on the starting rubber composition. In practice, and in the context of the means used to carry out the experimental plans described in the present patent application, the power consumed by these appliances is less than 10% of the power supplied by the motor and was deducted from the calculation of the power supplied by the motor, as announced above.

In another implementational choice, each metering and introduction appliance comprises its own motor, or some appliance groups comprise their own motor, and the operation of the combined motors of the device is controlled by a computer as a function of the data for the composition to be produced.

In the context of the implementation of the process according to the invention, and in order to confer the desired energy on the starting rubber composition, the rotor 101 of the mixing device is driven in rotation at a speed of between 50 rev/min and 500 rev/min, according to the fluidity of the mixtures to be produced and the length of the mixing chamber. Normally, the rotational speed is between 200 rev/min and 400 rev/min.

The present invention and the implementational example described above provide for the use of a continuous mechanical mixing means comprising just one rotor and, although the present description does not present the operating details thereof, a person skilled in the art will be able to find the adjustments which make it possible to use a continuous mixing means comprising several rotors, the threads of which are adapted in order to interact with one another. This is because it would appear that only this type of means is capable, in the current state of knowledge, of conferring a large amount of energy on the mixture in a very short time. This irrefutable fact does not in any way prejudge the possibility of employing a mechanical mixing process with equivalent pummelling and capable of conferring on the mixture, in a very short time, of between 20 and 60 seconds, a specific energy of between 2000 joules/gram and 5000 joules/gram.

The starting rubber composition at the outlet of the continuous mixing device can be cooled using several means known to a person skilled in the art, used alone or in combination, such as:
  a cooling device comprising two rolls comprising channels placed under the surface of the rolls in which a coolant circulates, the reduced air gap of which makes it possible to calender the rubber in order to create a thin sheet,
  a bath of refrigerated water through which the rubber strip to be cooled moves,
  a fresh air blower.

Nevertheless, it will be observed that the dimensions of the cooling means depend on the outlet flow rate of the starting rubber composition from the continuous mixing device. This means must make possible the cooling of the final rubber composition to a temperature of less than 140° C. in a time of less than 5 minutes, so as to avoid decomposition of the elastomer matrix when it is kept too long at a high temperature.

The final rubber composition is prepared in a more conventional way known to a person skilled in the art.

Figure 2:
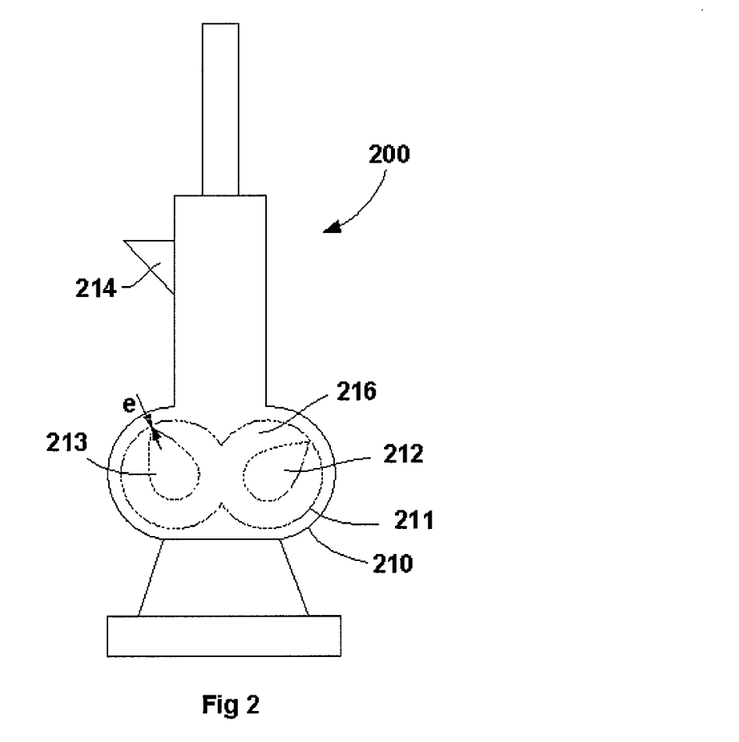
FIG. 2 represents a diagrammatic view of an internal mixer.

The internal mixer represented in FIG. 2 comprises a vessel 210, the internal surface 211 of which delimits the internal volume 216.

A motor (not represented) drives mixing blades in rotation via a transmission means of the gearbox type (not represented). The power consumed by the said transmission means is substantially constant and can be evaluated, as has already been indicated, by rotating the plant in neutral.

Introduction means 214 are provided at the top of the mixer in order to introduce the components.

The air gap e corresponds to the smallest distance between the blades and the internal surface 211 of the vessel 210. This value for the air gap is used to determine the value of the maximum theoretical shear rate, as has already been stated above.

In a known way, this internal mixture also comprises temperature regulation means which make it possible to contain the increase in the temperature of the final rubber composition within the limits conventionally practised.

It may prove to be necessary, if the dropping temperature of the mixture still remains too high, to provide an additional means, of the external mixer type, on which the introduction of the crosslinking system will be carried out.

Figure 3:
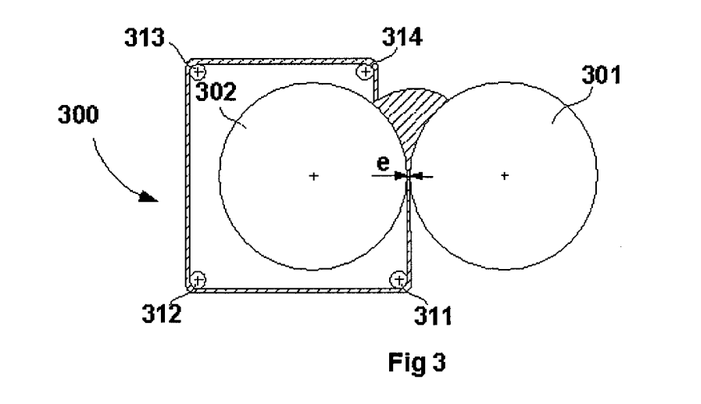
FIG. 3 represents a diagrammatic view of an external mixer.

The external mixer 300, also in a known way, is formed of two rolls 301 and 302 driven in rotation by a motor (not represented) via a transmission system (not represented). The space e of the rolls defines the air gap. Tensioner rolls make it possible to circulate the mixture after it has passed through the air gap. The components are introduced directly via the upper part of the roll.

This type of mixer, although it requires a long cycle time, is particularly well suited when it is desired to carry out a mixing at low temperature. The result of this is then a relatively long mixing time.

Of course, it is also possible to produce the final composition using the continuous mixing means by reintroducing the starting composition and also the crosslinking system and the additional components, and by adjusting the air gap of the screw and its rotational speed in order to transfer, to the mixture, a specific energy of between 500 joules/gram and 1800 joules/gram.

Figure 4:
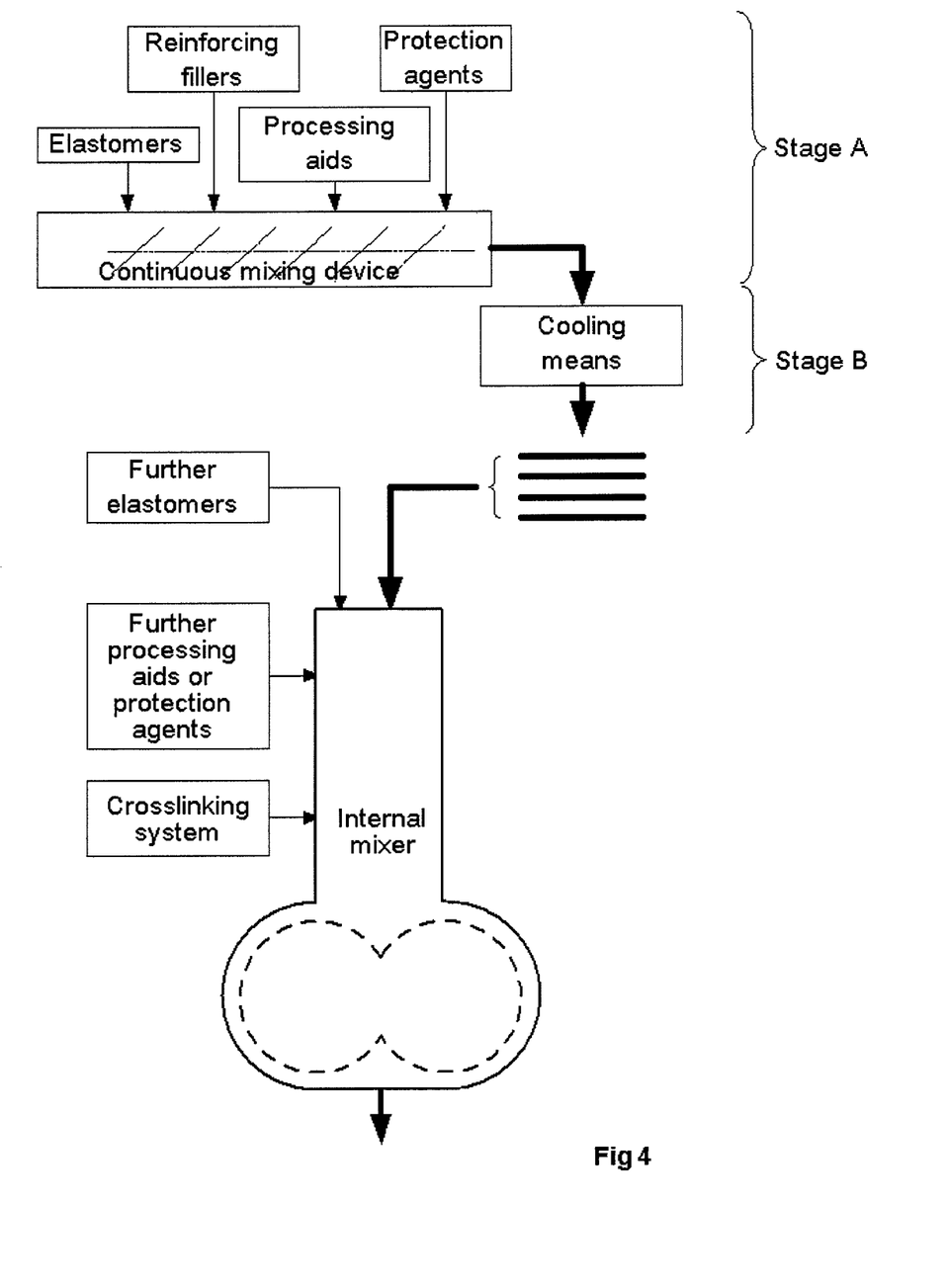
FIG. 4 represents a diagrammatic view of the various stages of the process.

FIG. 4 makes it possible to visualize the stages of the process according to the invention. A first stage A, during which the elastomers, then the reinforcing fillers, immediately downstream of the introduction point for the elastomers, and, finally, the additional components of the formulation, such as the additives, are successively introduced.

Due to the large amount of energy conferred on the starting rubber composition during this stage A, none of the main components forming the crosslinking system is introduced during this stage.

The starting rubber composition is taken up at the outlet of the continuous mixing device by the cooling means during the stage B, during which the temperature is lowered below 140° C. in less than 5 minutes, and then it is stored while waiting for the preparation of the final composition, which can be deferred in time.

It will also be observed that one of the means for transmitting the amount of energy to the starting rubber composition within the very brief mixing time provided in stage A consists in increasing the proportion of reinforcing fillers with respect to the amount of elastomers, which has the effect of increasing the viscosity of the mixture and of increasing the amount of energy supplied by the shearing of the mixture during passage through the air gap of the rotor and stator.

In consequence of which, and if such is the case, it is then necessary to add further elastomers during the stage of producing the final composition, so as to re-establish the proportions required by the formulation of the final rubber composition.

As was indicated above, the stage of producing the final composition is carried out using conventional mixing means into which a predetermined volume of the starting rubber composition produced during stage A and also the optional further elastomers and additives are introduced.

When the final composition is produced using an internal mixer of the type of that described in FIG. 2, and when the volume of additional elastomer introduced is high, the technique then comes closer to the known technique described as the introduction of deferred gums, and a large rise in temperature may occur, requiring an additional stage in order to introduce the crosslinking system. This introduction can then be carried out on an external or internal mixer, the operating conditions of which have been adjusted.

As has already been mentioned, in order to confer the desired amount of energy on the final rubber composition, the mixing time during the stage of producing the final composition can vary significantly according to whether an internal mixer or an external mixer or a continuous mixer is used, and a person skilled in the art will know how to carry out the necessary adjustments of these processes in order to achieve the desired levels of shearing and working.

By way of example, the following comparative results were obtained for a final rubber composition based on natural rubber (NR) and carbon black of the type:

| Components | in phr |
|---|---|
| NR | 100 |
| N234 | 54 |
| 6PPD[(1)] | 3 |
| Paraffin 6266 | 1 |
| Stearic acid | 1.5 |
| ZnO | 3 |
| CBS[(2)] | 1.2 |
| Sulphur | 1.2 |

[(1)]Santoflex 6PPD, supplied by Flexsys
[(2)]Santocure CBS, supplied by Flexsys The control results are obtained using a control process of conventional use of the internal mixer and external mixer (introduction of the crosslinking system) type, the main operating parameters of which are summarized below:

| Internal mixer | |
|---|---|
| Volume of the vessel | 3332 cm$^3$ |
| Mixing time | 214 sec |
| Dropping temperature of the mixture | 165° C. |
| Filling coefficient | 70% |
| Specific energy supplied | 721 J/g |
| Maximum theoretical value of the shearing | 177 s$^{-1}$ |
| Speed of the blades | 50 rpm |

| External mixer | |
|---|---|
| Mixing time | 600 sec |
| Air gap | 2 mm |
| Diameter of the rolls | 300 mm |
| Speed roll 1 | 15 rev/min |
| Speed roll 2 | 20 rev/min |

The improved final rubber composition was obtained with the process according to the invention, the main operating parameters of which are summarized below:

| Continuous mixing device (Stage A) | |
|---|---|
| Rotational speed of the rotor | 340 rpm |
| Specific energy supplied | 3370 J/g |
| Maximum theoretical value of the shearing | 30 000 s$^{-1}$ |

| Cooling device of cooling bath type (Stage B) | |
| --- | --- |
| Temperature of the bath | 40° C. |
| Residence time in the bath | 2.5 min |

| Final composition internal mixer | |
| --- | --- |
| Mixing time | 227 sec |
| Dropping temperature of the final rubber composition | 166° C. |
| Filling coefficient | 70% |
| Specific energy supplied | 958 J/g |
| Theoretical value of the shearing | 248 $s^{-1}$ |
| Speed of the blades | 50 and 70 rpm |

| Final composition external mixer | |
| --- | --- |
| Mixing time | 600 sec |
| Air gap | 2 mm |
| Diameter of the rolls | 300 mm |
| Speed roll 1 | 15 rev/min |
| Speed roll 2 | 20 rev/min |

The following comparative values (in base 100) were obtained:

| | Control process | Process according to the invention |
| --- | --- | --- |
| Modulus at 100 | 100 | 107 |
| Modulus at 300 | 100 | 127 |
| Modulus at 300/Modulus at 100 | 100 | 119 |
| Tangent $\delta_{max}$ | 100 | 85 |

The term "modulus at 100 (at 300) is understood to mean the modulus of elongation at 100% (at 300%) of a test specimen produced with the rubber composition, after vulcanization at 150° C.

These measures are carried out in accordance with French Standard NFT 46-002 of September 1988, which provides for the measurement in first elongation (i.e. without accommodation cycle—the moduli are then denoted M) of the true secant moduli (i.e., calculated with respect to the real cross section of the test specimen), expressed in MPa, at 100% and at 300% elongation. These tensile measurements are carried out under the standard conditions of temperature and hygrometry (23° C.+/−2° C., 50+/−5% relative humidity; French Standard NF T 40-01 of December 1979).

The dynamic properties (tangent δ) are measured on a viscosity analyser (Metravib VA4000) according to Standard ASTM D5992-96. The response of a sample of the vulcanized rubber composition (cylindrical test specimen with a thickness of 2 mm and a cross section of 315 mm$^2$), subjected to a simple alternating sinusoidal shear stress, at a frequency of 10 Hz, at a temperature of 23° C., is recorded. A peak-to-peak strain amplitude sweep is carried out from 0.1% to 50% (outward cycle) and then from 50% to 0.1% (return cycle); for the return cycle, the maximum value of the loss factor, denoted tan $\delta_{max}$, is recorded.

Other tests were carried out using a final rubber composition based on elastomer of SBR type and on carbon black of the type:

| Components | in phr |
| --- | --- |
| SBR[1] | 100 |
| N234 | 54 |
| 6PPD[2] | 3 |
| Paraffin 6266 | 1 |
| Stearic acid | 1.5 |
| ZnO | 3 |
| CBS[3] | 1.2 |
| Sulphur | 1.2 |

[1]SBR solution of 24% of 1,2-polybutadiene units, 46% of 1,4-polybutadiene units, 27% of stirene; Tg −48° C. (Tg determined on the elastomer by DSC).
[2]Santoflex 6PPD, supplied by Flexsys
[3]Santocure CBS, supplied by Flexsys.

The control results are obtained using a control process of conventional use of the internal mixer and external mixer (introduction of the vulcanization system) type, the main operating parameters of which are summarized below:

| Internal mixer | |
| --- | --- |
| Volume of the vessel | 422 cm$^3$ |
| Mixing time | 2 min 40 s |
| Dropping temperature of the mixture | 165° C. |
| Filling coefficient | 75% |
| Specific energy supplied | 1200 J/g |
| Maximum theoretical value of the shearing | 270 $s^{-1}$ |
| Speed of the blades | 70 rev/min |

| External mixer | |
| --- | --- |
| Mixing time | 600 sec |
| Air gap | 2 mm |
| Diameter of the rolls | 200 mm |
| Speed roll 1 | 15 rev/min |
| Speed roll 2 | 20 rev/min |

The improved final rubber composition was obtained with the process according to the invention, the main operating parameters of which are summarized below:

| Continuous mixing device (Stage A) | |
| --- | --- |
| Rotational speed of the rotor | 280 rev/min |
| Specific energy supplied | 3920 J/g |
| Maximum theoretical value of the shearing | 25 000 $s^{-1}$ |

| Cooling device of cooling bath type (Stage B) | |
| --- | --- |
| Temperature of the bath | 40° C. |
| Residence time | 2.5 min |

| Final composition internal mixer | |
| --- | --- |
| Mixing time | 2 min 40 sec |
| Dropping temperature of the final rubber composition | 170° C. |
| Filling coefficient | 75% |
| Specific energy supplied | 1400 J/g |
| Maximum theoretical value of the shearing | 300 $s^{-1}$ |
| Speed of the blades | 80 rev/min |

| Final composition external mixer | |
| --- | --- |
| Mixing time | 600 sec |
| Air gap | 2 mm |
| Diameter of the rolls | 200 mm |
| Speed roll 1 | 15 rev/min |
| Speed roll 2 | 20 rev/min |

The following comparative values (in base 100) were obtained:

|  | Control process | Process according to the invention |
| --- | --- | --- |
| Modulus at 100 | 100 | 86 |
| Modulus at 300 | 100 | 103 |
| Modulus at 300/Modulus at 100 | 100 | 120 |
| Tangent $\delta_{max}$ | 100 | 78 |

In both cases, a marked decrease in the tangent $\Box\delta_{max}$ value and an increase in the reinforcement index, defined as the ratio of the modulus at 300% to the modulus at 100%, are observed.

The invention claimed is:

1. A process for the manufacture of a rubber composition comprising as base elastomers, reinforcing fillers, additives and a vulcanization system, comprising the following stages:
A—using a continuous mixing device comprising a mixing chamber comprising at least one rotor rotating in a stator and extending between an upstream end and a downstream end, between which the material gradually advances, and comprising appliances for metering and forced introduction of the base elastomer or elastomers, driving back the base elastomers through a pipeline emerging upstream of the mixing chamber, a starting rubber composition comprising reinforcing fillers is produced, wherein said produced starting rubber composition does not include the vulcanization system, the operating parameters for the continuous mixing device being chosen so that:
 a—the residence time of the elastomer in the mixing chamber is between 20 and 60 seconds,
 b—the specific energy conferred on the rubber composition is between 2000 joules/gram and 5000 joules/gram,
B—at the outlet for the starting rubber composition from the mixing chamber, the temperature of the said starting rubber composition is lowered to a temperature of less than 140° C. in less than 5 minutes.

2. The process according to claim 1, wherein, during stage A, additives are also incorporated.

3. The process according to claim 1, wherein, during stage A, the rotational speed of the rotor is between 50 and 500 rev/min.

4. The process according to claim 1, wherein, during stage A, the rotational speed of the rotor is between 200 and 400 rev/min.

5. The process according to claim 1, wherein, during stage A, the maximum theoretical shear rate ($\dot{\gamma}$) of the rubber composition in the mixing chamber is between 15 000 s−1 and 40 000 s−1.

6. The process according to claim 1, wherein, during stage A, the degree of filling of the mixing chamber is between 5% and 40%.

7. The process according to claim 1, wherein, on conclusion of stage B, a final rubber composition is produced using one or more continuous or batchwise mixing means of internal and/or external mixer type, a predetermined volume of the starting rubber composition, the vulcanization system and also any remaining elastomer, fillers and additives being incorporated, the operating parameters for the continuous or batchwise mixing means being chosen so that the additional specific energy conferred on the rubber composition during this stage is between 500 joules/gram and 1800 joules/gram.

\* \* \* \* \*